Figure 1:
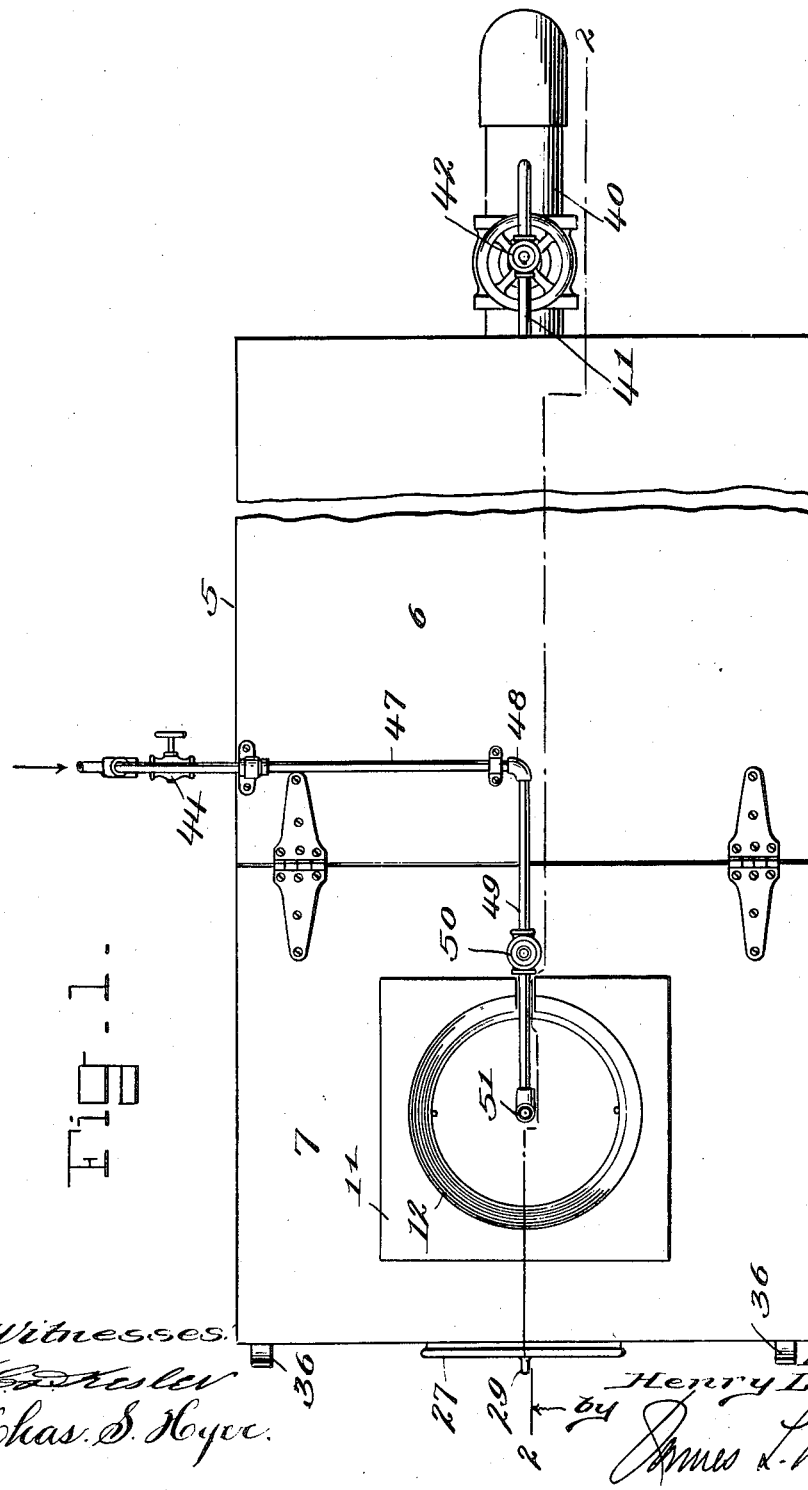

H. L. HOUGH.
SEPARATING APPARATUS FOR TURPENTINE.
APPLICATION FILED NOV. 23, 1912.

1,092,051.

Patented Mar. 31, 1914.

3 SHEETS—SHEET 1.

Witnesses
C. Kesler
Chas. S. Hyre

Inventor
Henry L. Hough
by James L. Norris, Atty

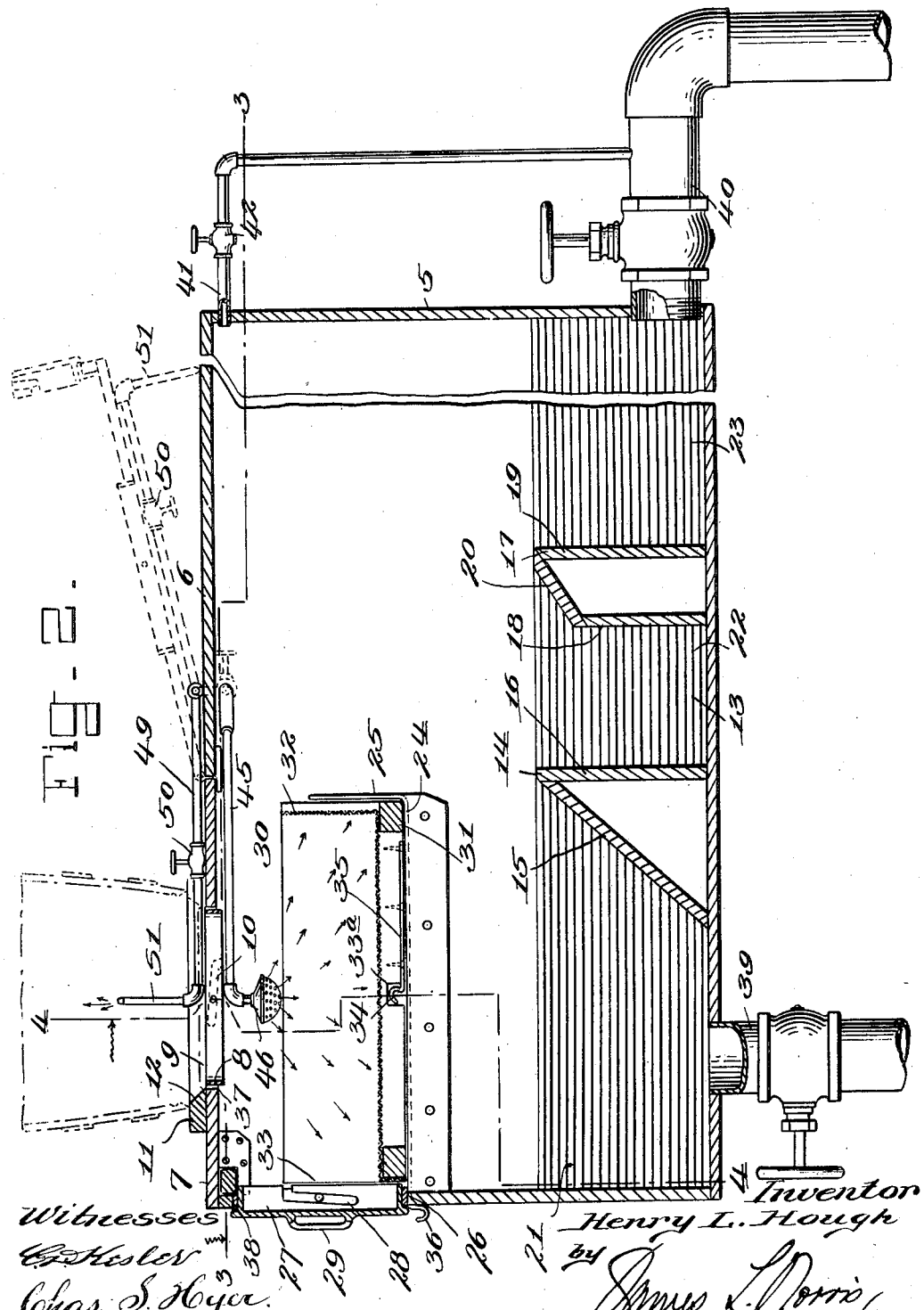

H. L. HOUGH.
SEPARATING APPARATUS FOR TURPENTINE.
APPLICATION FILED NOV. 23, 1912.
1,092,051.
Patented Mar. 31, 1914.
3 SHEETS—SHEET 3
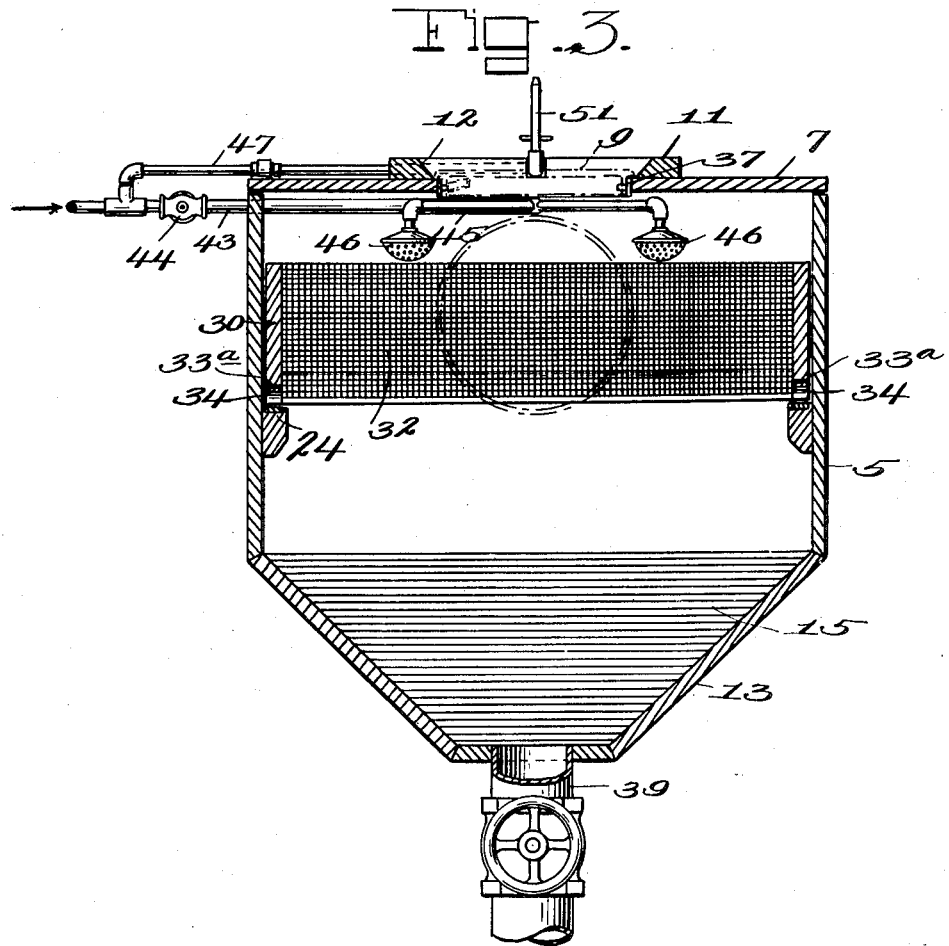
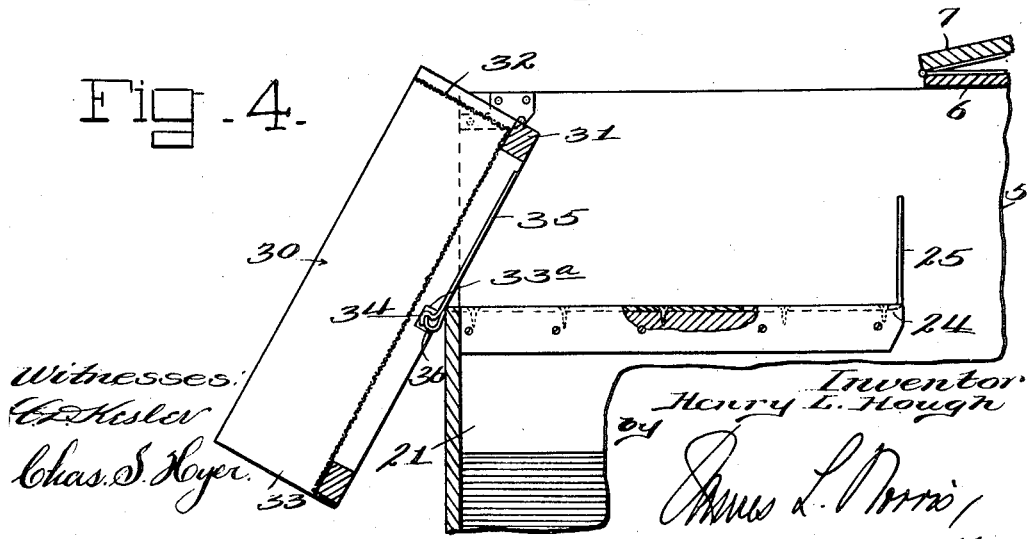
Witnesses:
Inventor
Henry L. Hough
by
James L. Norris
Atty.

UNITED STATES PATENT OFFICE.

HENRY L. HOUGH, OF REDLEVEL, FLORIDA.

SEPARATING APPARATUS FOR TURPENTINE.

1,092,051.

Specification of Letters Patent. Patented Mar. 31, 1914.

Application filed November 23, 1912. Serial No. 733,172.

*To all whom it may concern:*

Be it known that I, HENRY L. HOUGH, a citizen of the United States, residing at Redlevel, in the county of Citrus and State of Florida, have invented new and useful Improvements in Separating Apparatus for Turpentine, of which the following is a specification.

This invention relates to separators or cleaners for crude turpentine, and the primary object of the same is to provide an apparatus for separating leaves, sand and other trash or foreign matter from crude turpentine preparatory to distilling the same.

It is well known that in barreling crude turpentine bearing rosin at points where it is taken from the trees, leaves, sand and other foreign material collect in the receptacles or buckets and are poured with the turpentine into the barrels. The turpentine in this latter condition if deposited directly into a still will clog or cause a deposit of trash and foreign matter as well as sand and grit in the still and require cleaning operations relatively to the still, with disadvantages in expedition in separating the turpentine from the rosin by the usual methods, and, furthermore, the turpentine and rosin under such conditions must of necessity be subjected to further treatment to purify the same.

The improved apparatus embodying the features of the invention has therefore been devised to thoroughly separate the trash and foreign matter from the crude turpentine carrying the rosin and preliminarily prepare the turpentine for distillation and separation of the rosin and turpentine to produce cleaner products which in fact will be entirely free of foreign matter or dirt, with material advantage in economically preparing the turpentine and rosin for the market.

The invention consists in the construction and arrangement of the several parts which will be more fully hereinafter described and claimed in preferred form.

In the drawings: Figure 1 is a broken top plan view of an apparatus embodying the features of the invention. Fig. 2 is a longitudinal vertical section on the line 2—2, Fig. 1. Fig. 3 is a transverse vertical section taken in the plane of the line 4—4, Fig. 2. Fig. 4 is a detail longitudinal vertical section of a portion of the apparatus showing the manner of dumping and cleaning the separating drawer or receptacle.

The numeral 5 designates a tank which may be of any dimensions and proportions and constructed of suitable material. The tank is provided with a fixed top 6 and a hinged cover or closure 7 at one end, the said cover or closure being provided with an inlet opening 8 in which is removably fitted a cover 9 adapted to be locked tightly within the opening 8 through the medium of a bayonet joint, as at 10. It will be understood that any other suitable form of joint may be used for tightly holding the cover 9 in place in the opening. Surrounding the opening 8 and secured on the cover or closure 7 is a supporting rim 11 having a beveled opening 12 therethrough, the said rim being adapted to have a barrel disposed thereon, as shown in dotted lines by Fig. 2. The tank 5 has a trough-shaped bottom 13 and at a considerable distance from the ends a baffle 14 is secured within the said bottom and comprises a front inclined wall 15 and a rear vertical wall 16, the inclined wall 15 extending fully from the top of the vertical wall downwardly to the lowermost portion of the trough-shaped bottom 13. At a suitable distance from the baffle 14 and in rear of the latter is a second baffle 17 comprising two vertical walls 18 and 19 varying in vertical extent, or the front wall 18 is shorter than the rear wall 19, and from the upper end of the front wall to the upper end of the rear wall an angularly disposed deflecting board or member 20 is arranged, as shown by Fig. 2. By the disposition of the baffles 14 and 17 within the trough-shaped bottom 13 as just explained the said bottom is divided into three compartments 21, 22 and 23, the compartment 21 being of materially greater extent than the remaining compartments. Secured to the inner surfaces of the sides of the tank at a suitable elevation above the compartment 21 are ledges 24 having stop strips or guards 25 extending upwardly from the inner terminals thereof and in the adjacent end of the tank an opening 26 is formed and has its lower wall coincident with the upper edges of the ledges 24. The opening 26 is in the form of a hand hole and is normally covered by a cap or closure 27 suitably flanged and adapted to be locked in applied position through the medium of a bayonet joint 28 having an outer handle 29 for readily removing and applying the same. Slidably seated on the ledges 24 is a separating drawer or receptacle 30 comprising a frame 31 and a reticulated or wire gauze inclosure 32 which is open at the end 33 adjacent to the opening or hand hole 26. In other words, the reticulated or wire gauze inclosure 32 extends fully over the opposite sides, bottom and rear end of the drawer or receptacle 30 and the opposite end is fully open. The reticulated or wire gauze inclosure 32 has a suitable mesh which must be at least fine enough to prevent passage therethrough of small particles of leafy matter, sticks and other trash as well as larger portions of dirt and grit.

In the bottom of the frame 31 at each side of the latter a recess 33ª is formed to house a hook 34 having a shank 35 extending rearwardly and secured to the bottom of the side member of the base of the frame 31. The hooks 34 are bent upwardly and downwardly so that their open portions are in a downward direction, as clearly shown by Fig. 2, and are adapted to coöperate with hooks 36 secured below the lower portion of the wall of the opening or hole 26 and open upwardly so that when the drawer or receptacle 30 is drawn outwardly the hooks 34 will move into and catch on the hooks 36, as shown by Fig. 5, to facilitate dumping of the said drawer or receptacle 30 to relieve the latter of collected leaves, trash or sediment. It will be understood that the hinged cover 7 will be open and the cap or closure 27 removed from the opening 26 when it is desired to pull out the drawer or receptacle 30 so as to give ample clearance to the latter, and when the drawer is drawn outwardly it may be raked out or the collected matter therein otherwise removed therefrom. To render the opening or hole 26 as well as the opening 8 and the covers or caps 9 and 27 effective in forming tight joints when closed, suitable packings or packing rings 37 and 38 will be respectively mounted in the openings 8 and 26 so that the flanges of the covers or caps 9 and 27 will provide with the said packing rings sealed joints to prevent the escape of steam from the interior of the tank and which will be applied in a manner hereinafter more fully explained. It will also be understood that the caps or covers 9 and 27 will be applied and removed by a rotating movement thereof in view of the provision of the bayonet joints and through the medium of the latter joints the said caps or covers will be tightly drawn inwardly into their openings by a clamping action.

A valved drain pipe 39 is secured to the bottom of the trough 13 and opens into the lower portion of the compartment 21, and the rear compartment 23 is also adapted to be drained of its contents by means of a valved pipe 40. The compartment 22 may be relieved of its contents by hand operation through the top of the tank by opening the cover or closure 7. Connected to the upper portion of the rear end of the tank is a steam or vapor pipe 41 having a suitable valve 42, said pipe opening into the drain pipe 40 below and in rear of the valve in said drain pipe.

Extending into the upper portion of the tank beneath and close to the fixed top 6 thereof is a steam pipe 43 provided with a valve 44 and having divergent branches or a Y-continuation 45 at its inner end, and depending from the divergent branches are rose or spray heads 46 which depend close to the plane of the upper edges of the inclosure 32 and over the interior portion of the drawer or receptacle 30. Connected to the steam pipe 43 at a point in advance of the valve 44 is a steam conveying pipe 47 which extends inwardly over the upper surface of the fixed top 6 and is secured to the latter, and by means of a swivel coupling 48 of any suitable construction a pipe 49 is attached to the pipe 47 and at an intermediate point is provided with a valve 50 and at its inner terminal has an upwardly projecting nozzle 51 which is located directly over the center of the opening 8 and also projects upwardly from the center of the opening 12 of the rim 11, the nozzle 51 being of such length as to extend upwardly into the barrels that are placed on the rim 11.

In the preparation of the machine to receive a charge of turpentine carrying rosin, the cover 7 is tightly closed as well as the cap 27 and the cover or cap 9 is removed to expose the opening 8. The valves of the pipes 39 and 40 are also closed for the time being and the valve 42 of the pipe 41 is opened. A barrel of crude turpentine carrying rosin is then disposed on the rim 11, as shown by Fig. 2, and the contents thereof permitted to flow through the opening 8 into the drawer or receptacle 32, the capacity of the latter being sufficient at least to hold the contents of the barrel, or the said drawer may be of such dimensions as to hold a greater quantity of the crude turpentine to be treated or subjected to the separating operation. To thoroughly clean out the barrel, steam is permitted to enter the same through the nozzle 51 by opening the valve 50 and the residual contents of the barrel are thereby caused to flow downwardly and also flow into the drawer or receptacle 32. After the barrel has been emptied, the valve 50 is closed and the barrel removed, the cap or cover 9 being placed in position in the opening 8. Steam is then turned on through the pipe 43 by opening the valve 44 and is sprayed through the heads 46 downwardly, as indicated by the arrows, into the drawer or receptacle 32 to maintain the crude turpentine carrying the rosin at a proper consistency and prevent clogging of the screen body of the drawer and at the same time facilitate forcing the crude turpentine and rosin downwardly through the bottom of the drawer or receptacle into the compartment 21. Leaves, sticks, heavier trash and other foreign material that will not pass through the bottom of the screen inclosure 32 are held in the drawer or receptacle 30 and the vapors, together with the steam, pass off through the pipe 41 downwardly into the pipe 40 and become condensed, thereby saving all the turpentine and by-products or preventing the same from being lost.

The crude turpentine carrying the rosin falling into the receptacle 21 goes through the first cleaning or purifying step after being deprived of the coarser trash or impurities in the drawer or receptacle 30, and in this first compartment 21 the heavier particles of dirt and sand that may have come through the screen bottom of the inclosure 32 of the drawer 30 settle to the bottom of the said compartment and the turpentine carrying the rosin overflows the upper edge of the first baffle 14 and runs into the second compartment 22, where another settling operation takes place, and as the second compartment 22 is filled it overflows the upper edge of the second baffle 17 and flows into the third compartment 23 in a practically purified condition as the remaining finer sand or silt carried with the turpentine and rosin into the second compartment 22 is deposited in the latter by gravitation or allowed to settle.

It will be understood that a number of barrels of crude turpentine carrying rosin may be disposed on the apparatus and emptied of their contents for separating purposes in view of the fact that the operation becomes continuous through the decantation of the turpentine and rosin from one compartment into another and the better grade of the turpentine and rosin is drawn off from the compartment 23 by opening the valve of the pipe 40, whereas the less purified grade is taken through the pipe 39 by opening the valve of the latter from the compartment 21 and with the turpentine and rosin in the latter compartment the sediment also flows off and the whole may be further treated or subjected to the separating operation until it is practically free of all foreign material. When it is desired to relieve the drawer or receptacle 30 of collected trash, the steam is shut off from the pipe 43 by closing the valve 44 and the cover 7 is opened, the swivel joint or union 48 between the pipes 47 and 49 permitting the pipe 49 to be swung back with the cover. When the cover 7 is opened, the cap 27 is also removed and the drawer or receptacle is drawn out, as shown by Fig. 5, and its contents dumped and at the same time the reticulated walls thereof may be cleaned and afterward the drawer or receptacle is reset and the cover closed and the cap 27 placed in proper position, as shown by Fig. 2, when the valves will be ready for further operation in separating impurities from crude turpentine carrying rosin in the manner hereinbefore explained.

As hereinbefore explained, the baffles 14 and 17 respectively have the walls thereof adjacent to the overflow portions of the compartments 21 and 22 materially differing in arrangement, that is, the wall 15 is inclined throughout its length, whereas the wall 18 is vertical and intersects an upper short inclined wall 20. This difference in contour of the walls of the baffles 14 and 17 as just stated provides for a more prolonged or positive settlement of the finer particles in the compartment 22 by resisting a quick overflow between the two vertical walls of the latter compartment and an easier overflow, and a less positive deposit or gravitation of the finer particles in the compartment 21 for the reason that the compartment 22 must gradually fill up to the height of the vertical wall 18 of the baffle 17 before an easeoff ensues through the medium of the short inclined wall 20. The heavier substances or grit passing through the screen bottom of the inclosure 22 into the compartment 21 will settle in the latter compartment, and in order to separate the finer particles or the silt from the turpentine and rosin the compartment 22 is provided with a greater resistance to rapid overflow or decantation by reason of the vertical wall 18 as specified.

In the construction of the several parts of the apparatus material that is best adapted for the purpose will be used, and, furthermore, the dimensions and proportions of the several parts may be varied at will and likewise the details of construction may be modified within the scope of the invention.

What is claimed is:

1. In a separating apparatus of the class specified, the combination of a tank having a series of settling compartments in the bottom thereof and an upper ingress opening adjacent to one end for the entrance of the material to be treated, a closure for said opening, a separating receptacle under the ingress opening and above the first of the series of compartments, and steam spray devices above the said receptacle and below the plane of the closure.

2. In a separating apparatus of the class specified, a tank having a series of settling compartments in the bottom thereof and an ingress opening in the top adjacent to one end of the tank for the introduction of the material to be treated, a separating receptacle below the ingress opening and provided with bottom and side walls having openings therein, the said separating receptacle being disposed above the first of the series of compartments, and spray devices disposed over the receptacle for injecting steam into the upper portion of the said separating receptacle.

3. In a separating apparatus of the class specified, a tank having a hinged cover in the top provided with a normally closed ingress opening for delivering material to be treated to the interior of the tank, a reticulated separating receptacle below the ingress opening to receive the material to be treated, the bottom of the tank being of trough-like shape, the tank having a series of settling compartments formed in the trough-like bottom thereof and means for spraying steam into the separating receptacle and to the contents thereof to facilitate the deposit of the latter in part in the trough-like bottom of the tank.

4. In a separating apparatus of the class specified, the combination of a tank having a bottom of trough-like shape and an upper ingress opening for the receptacle to be treated, the tank having partitions vertically disposed in the trough-like bottom, and a separating receptacle slidingly disposed under the ingress opening and provided with a reticulated bottom and adapted to deposit a portion of its contents into the trough-like bottom of the tank.

5. In a separating apparatus of the class specified, the combination of a tank having a trough-like bottom with a plurality of vertical partitions, an upper ingress opening for the material to be treated being formed in the upper portion of one extremity of the tank and provided with a closure and a steam spraying device, a separating receptacle under the ingress opening provided with a reticulated bottom and side walls, and means for spraying steam into the upper part of the receptacle below said ingress opening.

6. In a separating apparatus of the class specified, the combination of a tank having a bottom constructed to receive and settle a fluid and also provided with an upper ingress opening for the material to be treated, and a separating receptacle under the ingress opening above the bottom of the tank and movable outwardly through the adjacent end of the tank for dumping disposition and having reticulated sides and bottom, and steam spraying devices disposed over the receptacle below the ingress opening.

7. In a separating apparatus of the class specified, the combination of a tank having an upper hinged cover with a normally closed ingress opening therethrough, the adjacent end of the tank also being provided with an opening having a closing cap, a separating receptacle below the hinged cover having reticulated sides and bottom and movable through the opening in one end of the tank and provided with means for dumping the receptacle, and steam spraying devices disposed over the receptacle.

8. In a separating apparatus of the class specified, the combination of a tank having a series of settling compartments in the bottom thereof and an upper ingress opening for the material to be treated, valved outlet pipes communicating with the compartments, a valved vapor pipe attached to the upper portion of one end of the pipe and also communicating with one of the outlet pipes, the top of the tank being provided with an ingress opening for the material to be treated, a cap removably mounted in said opening, a separating receptacle under the ingress opening and above the first of the series of compartments, and provided with reticulated sides and bottom and means for spraying steam into the receptacle.

9. In a separating apparatus of the class specified, the combination of a tank having a series of settling compartments in the bottom thereof divided by baffles having front inclined walls, the settling compartments being provided with valved outlet pipes, the top of the tank being provided with an ingress opening for the material to be treated, and a separating receptacle having a reticulated bottom under the ingress opening and above the first of the series of compartments.

10. In a separating apparatus of the class specified, the combination of a tank having a bottom for settling material deposited thereon and an upper ingress opening, a slidable separating receptacle disposed under the ingress opening and partially movable through one end of the tank, the receptacle having reticulated side and bottom walls, means for spraying steam into the upper portion of the receptacle, and means carried by the bottom of the receptacle and one end of the tank for causing a dumping operation of the receptacle.

11. In a separating apparatus of the class specified, the combination of a tank having a bottom for deposit of material treated thereon, the tank also having a top which includes a hinged cover with an ingress opening therethrough provided with a removable cap, a steam pipe having a portion thereof extending into the tank and provided with spray devices, said steam pipe also having a branch extending over the top of the tank and terminating in an upwardly projecting nozzle over the ingress opening, and a separating receptacle below the ingress opening and steam spray devices within the tank.

12. In a separating apparatus of the class specified, the combination of a tank having a bottom for deposit of material treated thereon, the tank also having a top which includes a hinged cover with an ingress opening therethrough provided with a removable cap, a steam pipe having a portion thereof extending into the tank and provided with spray devices, said steam pipe also having a branch extending over the top of the tank and terminating in an upwardly projecting nozzle over the ingress opening, and a separating receptacle below the ingress opening and steam spray devices within the tank, the pipe extending upwardly over the top of the tank having a swivel connection whereby it may be swung backwardly and forwardly with the cover in the opening and closing movements of the latter.

In testimony whereof I have hereunto set my hand in presence of two subscribing witnesses.

HENRY L. HOUGH.

Witnesses:
D. W. BEATY,
JOHN WATERS.